United States Patent [19]

Miura et al.

[11] 4,106,032

[45] Aug. 8, 1978

[54] APPARATUS FOR APPLYING LIQUID DROPLETS TO A SURFACE BY USING A HIGH SPEED LAMINAR AIR FLOW TO ACCELERATE THE SAME

[75] Inventors: Masayoshi Miura; Kiyoshi Yamamori; Akira Mizoguchi, all of Kawasaki, Japan

[73] Assignee: Matsushita Electric Industrial Co., Limited, Japan

[21] Appl. No.: 782,170

[22] Filed: Mar. 28, 1977

Related U.S. Application Data

[63] Continuation-in-part of Ser. No. 616,636, Sep. 25, 1975, abandoned.

[30] Foreign Application Priority Data

| | | | |
|---|---|---|---|
| Sep. 26, 1974 | [JP] | Japan | 49-111279 |
| Mar. 20, 1975 | [JP] | Japan | 50-34109 |
| Jun. 13, 1975 | [JP] | Japan | 50-72555 |
| Jun. 16, 1975 | [JP] | Japan | 50-73469 |

[51] Int. Cl.[2] .......... G01D 15/18

[52] U.S. Cl. .......... 346/140 R

[58] Field of Search .......... 346/140 R, 75; 239/291, 239/300, 290

[56] References Cited

U.S. PATENT DOCUMENTS

| | | | |
|---|---|---|---|
| 2,278,940 | 4/1942 | Murphy | 358/75 |
| 2,577,894 | 12/1951 | Jacob | 346/75 |
| 3,747,120 | 7/1973 | Stemme | 346/140 X |

*Primary Examiner*—Joseph W. Hartary

*Attorney, Agent, or Firm*—Robert E. Burns; Emmanuel J. Lobato; Bruce L. Adams

[57] ABSTRACT

Apparatus for applying droplets of colored liquid to a surface includes a chamber divided into a liquid chamber portion and an air chamber portion. The liquid chamber portion includes an intake channel connected to a liquid supply container and a discharge channel through which the liquid is discharged for deposition on the surface. A pressure producing means is in contact with the liquid chamber portion to produce periodic pressure increases in the liquid in the chamber portion to eject it through the discharge channel to the atmosphere in a series of droplets. The air chamber portion includes an intake channel connected to a source of pressurized air and a discharge channel axially aligned with the discharge channel of the liquid chamber portion to allow the air to be discharged therethrough to the atmosphere at a high speed. The liquid droplets are thus discharged through the two axially aligned discharged channels and accelerated by the stream of air along their passage to the surface.

10 Claims, 10 Drawing Figures

APPARATUS FOR APPLYING LIQUID DROPLETS TO A SURFACE BY USING A HIGH SPEED LAMINAR AIR FLOW TO ACCELERATE THE SAME

This is a continuation-in-part application of Ser. No. 616,636 filed on Sep. 25, 1975 now abandoned.

BACKGROUND OF THE INVENTION

The present invention relates to apparatus for applying fluid droplets to a writing surface, and more particularly to improvement to a mechanism for writing on paper with an ejected colored liquid.

The speed of recording data on paper in, for example, a data processing system is limited for one thing by the capability of the writing mechanism, which in many cases is substantially less than that of the data processing system.

Because of the high speed capability of the ink ejection type writing mechanism, many proposals have been made in which the liquid is discharged onto the paper by application of electrical pulses, the liquid being ejected in a series of pulsed droplets. The speedof the writing mechanism is in turn largely determined by the capability of the liquid responding to the rapidly occurring electrical pulses. However, the voltage of the electrical pulses must be high enough to overcome the resistance offered by the liquid due to its surface tension and viscosity. The range of voltage necessary for driving the writing unit (dynamic range of a writing mechanism) is therefore determined by the resistance of the liquid to the applied pulses. Prior art writing mechanisms have a narrow dynamic range. This resulted in liquid droplets of comparatively large size and therefore satisfactory gradation of image cannot be obtained on the writing surface.

Because of the high operating speed of the writing mechanism, the liquid droplets are ejected onto a sheet of paper which is wrapped around a roller revolving at a high speed. Since a series of droplets is formed upon ejection in response to a single electrical pulse, they tend to land on different localities of the writing surface, thus causing a blur on the image. Furthermore, the high speed revolution of the roller creates a whirl of wind at the surface which would cause dispersion of the ejected droplets.

SUMMARY OF THE INVENTION

Therefore, an object of the present invention is to provide an improved liquid applying apparatus which assures a wider dynamic range than is available by the prior art apparatus to thereby decrease the size of droplets to be deposited on the writing surface.

Another object is to provide an improved liquid applying apparatus in which liquid droplets ejected in response to a single pulse are accelerated by a stream of air so that they land on the writing surface at substantially the same instant of time.

A specific object of the invention is to provide a liquid applying apparatus having a pneumatic chamber connected to a source of pressurized air and an improved arrangement for connecting a liquid supply container with the source of pressurized air.

These and other objects are accomplished in accordance with the invention by apparatus having an improved chamber which includes means separating the chamber into a pneumatic chamber portion and a liquid chamber portion, a liquid discharge channel formed in the separating means, an air discharge channel or nozzle axially aligned with the liquid discharge channel, a liquid intake channel in communication with the liquid chamber for the supply of liquid and an air intake channel in communication with the pneumatic chamber portion for the supply of pressurized air. The liquid chamber portion is in contact with a pressure producing means which produces periodic pressure increases in the liquid in the liquid chamber portion. The liquid and air discharge channels are opposite to the pressure producing means for deposition of liquid droplets therethrough onto a writing surface.

The pneumatic chamber portion is a disc-like configuration and the air intake channel is connected at the periphery thereof and the air discharge channel is located at the center thereof. The cross-sectional area of the air discharge channels is selected in relation to the cross-sectional area of the liquid discharge channel in order that a laminar air flow is formed at the exit thereof.

The source of pressurized air is in communication with the liquid supply container to increase the pressure in the liquid in relation to the air pressure. This prevents the intrusion of air into the liquid chamber portion.

BRIEF DESCRIPTION OF THE INVENTION

The present invention will be understood from the following description when read in conjunction with the accompanying drawings, in which.

DESCRIPTION OF THE PREFERRED EMBODIMENTS

Figure 1:
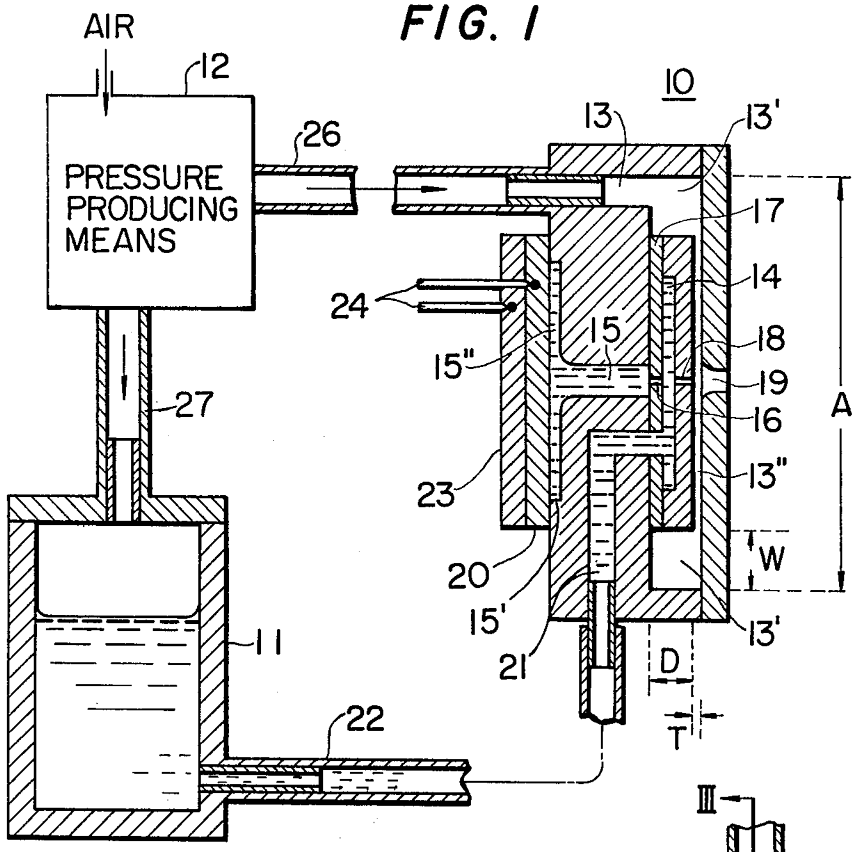
FIG. 1 is a cross-sectional view of one embodiment of liquid applying apparatus according to the present invention.

Referring to FIG. 1 apparatus of the present invention is shown and comprises generally a liquid applying unit 10, a liquid supply container 11 and a pneumatic pressure producing means 12. The liquid applying unit 10 comprises an outer chamber portion 14, an inner chamber portion 15 and a pneumatic chamber portion which includes an intake channel 13 connected to the pressure producing means 12 via a conduit 26, an annular chamber portion 13′ and a disc-like chamber portion 13″ which is in communication with the atmosphere via a discharge channel 10. The thickness of the disc-like chamber portion 13" is substantially smaller than the depth, or axial dimension of the annular chamber portion 13'. The outer and inner chambers 14 and 15 are in communication through a connecting channel 16 which is provided in a dividing plate 17 situated between and forming the separation of the liquid chamber into the chamber portions 14 and 15. The connecting channel 16 is positioned in the dividing plate 17 so that it is directly opposite to and axially aligned with a discharge channel 18 which is provided at the outer end of the outer liquid chamber 14 and opens to the atmosphere from the outer chamber portion 14 through the discharge channel 19. The discharge channel 19 is axially aligned with the discharge channel 18. A circular metal plate or membrane 20 is fastened to the wall 15' of the inner chamber portion 15. The dividing plate 17 has an intake channel 21 which opens into the outer liquid chamber 14 and is in communication with the fluid container 11 via a conduit 22. The container may be disposed at a lower level than the discharge channel 18 because of the capillary forces existing in the channels communicating with the outer chamber portion 14. A piezoelectric crystal 23 is attached to the metal membrane 20 in any conventional manner. Conductive wires 24 are provided, one being electrically connected to the metal membrane 20 and the other to the piezoelectric crystal 23. The wires 24 supply control pulses to the crystal 23. The inner liquid chamber portion 15 has its one end opposite to the outer chamber portion 14 a larger diameter portion 15" which is in contact with the metal membrane 20. The cross-sectional area of the discharge channel 18 is substantially smaller than the cross-sectional area of the larger diameter portion 15", and slightly smaller than the cross-sectional area of the discharge channel 19.

When the crystal 23 is activated by a pulse, fluid is discharged from the inner chamber portion 15 through the connecting channel 16, through the fluid layer in the outer chamber portion 14 and further through the discharge channels 18 and 19 whereupon it is applied to a writing surface. When the voltage pulse drops to zero the direction of the fluid stream in the connecting channel 16 is reversed and fluid is now sucked in through the outer chamber portion 14 from the container 11 via the intake channel 21.

On the other hand, a stream of air is supplied by constant pressure from the pressure producing means 12 to the annular chamber portion 13' through the intake channel 13. The air stream diverges as it flows through the annular path of the chamber portion 13' and converges spirally toward the center of the disc-like chamber portion 13" and then escapes through the discharge channel 19 at a high speed. The velocity of the air at the exit of the discharge channel 19 should be greater than the speed at which the liquid is discharged so that the discharged liquid is accelerated by the air stream. Since the liquid breaks up into a series of droplets of decreasing size in the direction toward the discharge channel 19 upon discharge, the droplets of smaller size are accelerated at a higher speed than the droplets of large size so that they tend to coalesce and land on the writing surface as a single droplet corresponding to an excitation pulse.

Figure 2:
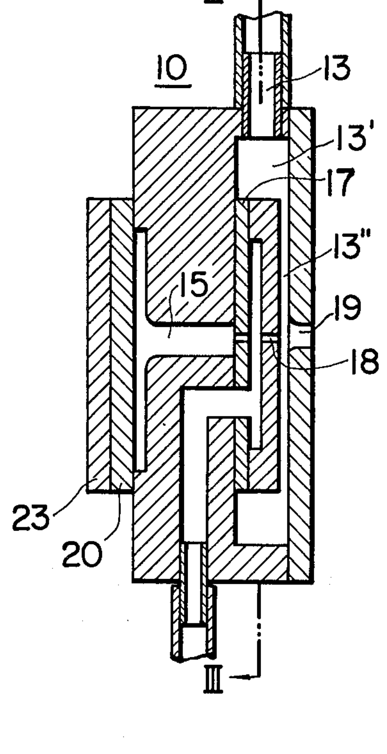
FIG. 2 is a cross-sectional view of one embodiment of liquid applying apparatus according to the invention showing a connection of an air intake channel to the pneumatic chamber portion.
Figure 3:
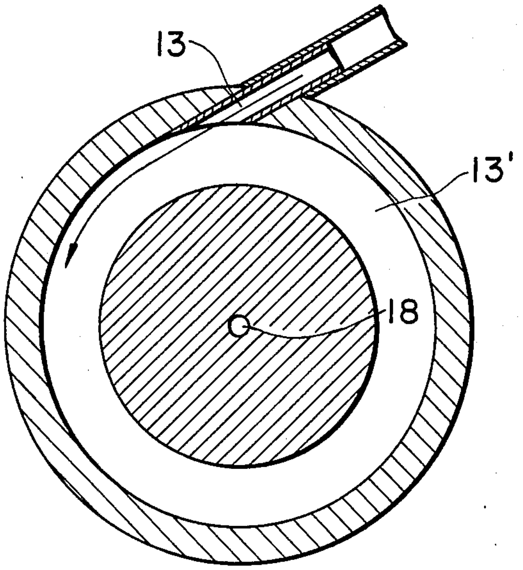
FIG. 3 is a cross-sectional view taken along the lines 3—3 of FIG. 2.

The axial direction of the intake channel 13 may preferably be tangential to the periphery of the annular chamber portion 13' as illustrated in FIGS. 2 and 3 so that a circular flow of air is formed in the annular chamber portion 13' as indicated by the arrow in FIG. 3 and that the air flows into the disc-like chamber portion 13" in a spiral form radially inwardly toward the discharge channel 19.

Exemplary dimensions of the liquid applying unit 10 which provides a laminar flow at the outlet of the discharge channel 19 are as follows:

| | |
|---|---|
| Outer diameter of annular chamber portion 13' | 20 mm |
| Width of annular chamber portion 13' (W) | 1 - 4 mm |
| Depth of annular chamber portion 13' (D) | 0.5 - 2 mm |
| Thickness (T) of disc-like chamber portion 13" | 10 - 100 μm |
| Diameter of discharge channel 18 | 40 μm |
| Diameter of discharge channel 19 | 100 - 150 μm |
| Pneumatic pressure in disc-like chamber portion | 100 - 1000 mm Aq |

Because there is no axial component in the spiral air flow in the disc-like chamber portion 13", the air may be sucked into the outer chamber portion 14 and further into the inner chamber portion 15 through the discharge channel 18 from the disc-like chamber portion 13" and prevents satisfactory ejection of liquid. In order to prevent such air intrusion, the liquid container 11 is communicated with the pressure producing means 12 via a conduit 27.

Figure 4:
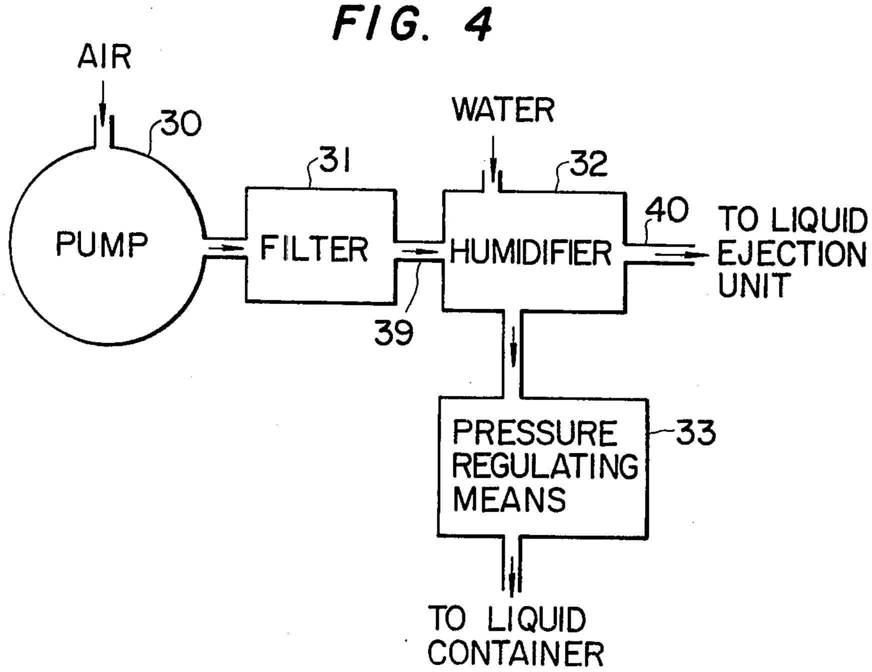
FIG. 4 is a schematic functional block diagram of a source of pressurized air employed in the embodiment of FIG. 1.

The pressure producing means 12 comprises, as shown in FIG. 4, a pump 30, an air filter 31 connected to the outlet of the pump unit 30 to filter out any foreign particles and to dampen oscillations of air flow which might be generated from the pump 30. The outlet of the filter 31 is preferably connected to a humidifier 32 to impart moisture to the air to be supplied to the liquid applying unit 10. The outlet of the humidifier 32 is also connected to a pressure regulating means such as a valve 33, the outlet of the valve 33 being connected to the liquid supply container 11 via the conduit 27. The static pressure in the liquid in the container 11, and hence the static pressure in the liquid in the discharge channel 18, are thereby increased, and regulated manually by the valve means 33 such that the static pressure in the liquid in the discharge channel 18 is balanced against the pressure in the air chamber 13".

Figure 10:
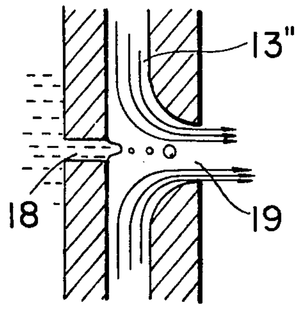
FIG. 10 is a cross-sectional view showing the flow of air from the disc-like chamber to the atmosphere.

This contributes to the lowering of surface tension on the boundary surface or layer of the liquid in the inner discharge channel 18 and facilitates the ejection of liquid to the atmosphere through the outer discharge channel 19 (FIG. 10). With the pressure balance so established on opposite sides of the boundary layer, a threadlike laminar air flow can be obtained when the ratio of the diameter of the inner discharge channel 18 to that of the outer discharge channel 19 is in a range from 2:5 to 4:15, and the ratio of the diameter of the inner discharge channel 18 to the thickness of the disc-like chamber 13" is 1:less then 2.5. Because of the lowering of surface tension, the minimum excitation voltage applied to the piezoelectric device 23 is lowered, every shading nuance of the original picture can be reproduced. In addition, the laminar air flow acts on the ejected droplets to coalesce prior to reaching the writing surface, the edges of the reproduced image can be sharply defined.

Figure 5:
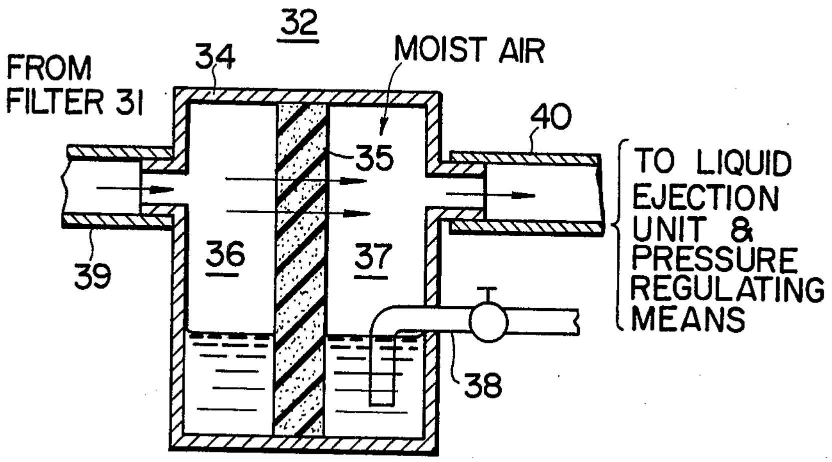
FIG. 5 is a cross-sectional view of one embodiment of a humidifier of FIG. 4.

During the intervals when the control pulses are not supplied to the crystal 23, the surface area of the liquid in the discharge channel 18 is likely to be dried up to thereby increase its viscosity. The humidifier 32 keeps its liquidity by providing moisture to the air stream. As illustrated in FIG. 5, the humidifier 32 comprises a housing 34, a porous member 35 such as sponge or fibrous material which divides the interior of the housing into an inlet chamber 36 and an outlet chamber 37. A water supply pipe 38 is connected to the side wall of the housing 34 to fill a lower portion of the housing 34 with water. The lower part of the porous member 35 is immersed in the water so that water permeates throughout the porous material by absorption. The inlet chamber 36 is in communication by a conduit 39 with the filter 31 and the outlet chamber 37 is connected by a conduit 40 to the intake channel 13 of the liquid applying unit 10. The pressurized air is admitted into the inlet chamber 36 from the filter 31 and moisture laden air emerges from the outlet chamber 37.

Figure 6:
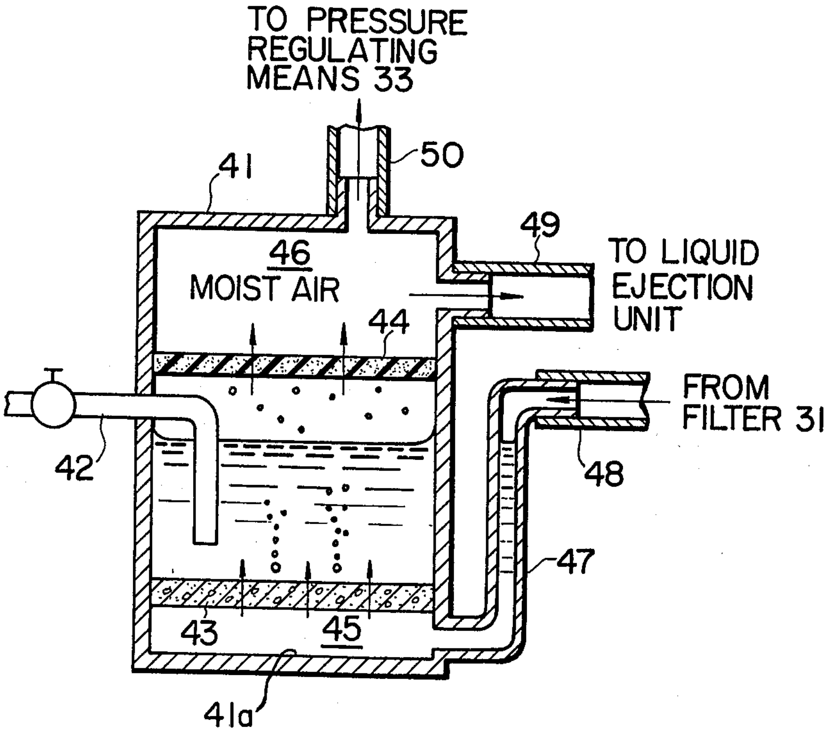
FIG. 6 is a cross-sectional view of another embodiment of the humidifier of FIG. 4.

An alternative arrangement of the humidifier 32 is illustrated in FIG. 6. The housing 41 is partially filled with water supplied from pipe 42. A porous porcelain or porous glass member 43 is disposed at the lower part of the housing spaced from its bottom wall 41*a* defining a lower chamber 45. A porous member 44 such as sponge or fibrous material is preferably provided in a position above the surface of the water defining an upper chamber 46. The lower chamber 45 is connected to the fulter 31 through conduits 47 and 48 and the upper chamber 46 is connected to the intake channel 13 of the unit 10 via conduit and further connected to the pressure regulating means 33 via a conduit 50. When air is admitted into the lower chamber 45 from filter 31, the air will be forced into the water through the porous glass 43 and emerges as air bubbles which float upward to the surface. The porous member 44 absorbs the splashes caused by the upward flow of the bubbles, but admits moisture laden air to pass therethrough to the outlet chamber 46.

Experiments were conducted to assure satisfactory operation of the liquid applying unit of the invention.

Figure 7:
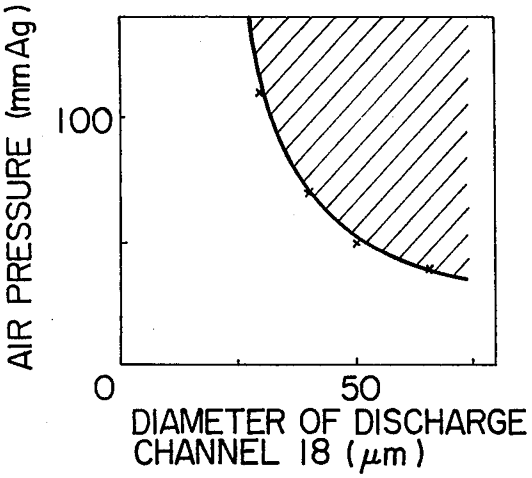
FIG. 7 is a graph showing a relation between the diameter of liquid discharge channel and the air pressure.

In FIG. 7 the relation between the air pressure and the diameter ($d$) of discharge channel 18 is ilillustrated. In this experiment, it was assumed that the diameter of discharge channel 19 is approximately $2d + 20\mu m$ and the thickness of the disc-like chamber 13″ is 20 $\mu m$. The lower limit of the air pressure required to provide a laminar flow at the exit of discharge channel 19 follows the curve which decays in a manner similar to an exponential curve with the increase in the diameter of discharge channel 18.

Figure 8:
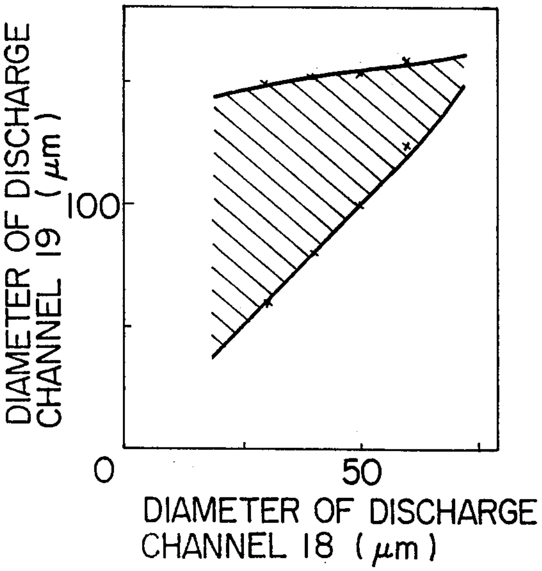
FIG. 8 is a graph showing a relation between the diameters of liquid and air discharge channels.

FIG. 8 shows the relation between the diameters of discharge channels 18 and 19, and indicates that a wider range of diameters is available for the outer discharge channel 19 when the inner discharge channel 18 has a smaller diameter than when it has a larger diameter.

Figure 9:
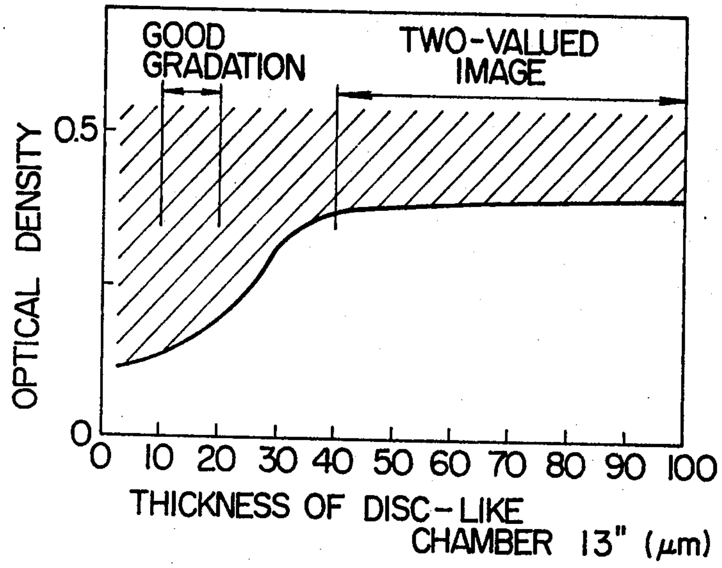
FIG. 9 is a graph showing a relation between the thickness of disc-like chamber and the optical density of an image produced on the surface.

FIG. 9 shows the relation between optical density and the thickness of disc-like chamber 13″, and indicates that at a smaller thickness value the optical density of the image produced on the writing surface by deposition of droplets is smaller than at a larger thickness value. Good gradation of images was obtained for the thickness value ranging from 10 to 20$\mu m$. The thickness value in the range from 40 to 100$\mu m$ was found suitable for two-valued image reproduction, such as black-and-white documents.

By formation of a high speed laminar air flow at the exit of the liquid discharge channel 18, the following advantages are provided.

1. A series of droplets of decreasing size is accelerated by the air stream so that the droplets of smaller size are accelerated at a higher speed because of their small inertia than the droplets of larger size. They land on the writing surface substantially at the same instant of time on substantially the same locality of the surface. This increases the resolution of the image produced.

2. The liquid in the inner discharge channel 18 is prevented from being dried because of the moisture provided by the humidifier.

3. The range of droplet size is increased because the pressure at the exit of the discharge channel 18 lower than the pressure in the liquid therein assists in ejecting liquid upon application of an electrical pulse. Therefore, the threshold value at which the droplets of the smallest size are ejected is lowered.

4. The air stream serves to avoid objectionable effect caused by high speed rotation of a paper drum or roller by guiding the discharged droplets to the paper surface at a high speed which in some cases reaches 80 meters per second.

5. Because the discharged liquid droplets are guided by the air stream, the distance travelled by the droplets can be increased to advantage to allow the spacing between the liquid ejection apparatus and the writing surface.

What we claim:

1. Apparatus for applying liquid droplets to a surface comprising, a housing including a first liquid chamber for containing a liquid to be applied to a surface and having an associated piezoelectric device for generating short-duration rises of the pressure of liquid in the first liquid chamber, a second liquid chamber communicating with the first chamber through a connecting channel and having a first discharge channel for droplets of said liquid to leave the apparatus, the first discharge channel being in alignment with the connecting channel and in close proximity thereto so that a short-diration pressure rise in the first liquid chamber causes a series of liquid droplets of decreasing size to be expelled through the first discharge channel, the second liquid chamber having a first intake channel connected to a liquid supply source, a pneumatic chamber substantially divided into an inner, disc-like portion formed with a second discharge channel and an outer, annular portion formed with a second intake channel connected to a source of pressurized air, the second discharge channel being in alignment with the first discharge channel and in close proximity thereto, means for providing communication for the liquid supply source with the air supply source to increase the pressure in the liquid in the first discharge channel relative to the pressure at an exit thereof so that the pressurized air is admitted firstly into the annular portion of the pnuematic chamber, then into the disc-like portion thereof and expelled through the second discharge channel in the form of a laminar jet stream, whereby droplets of said liquid of smaller size when expelled through the first discharge channel are accelerated by the jet stream of air at higher speeds than droplets of large size so that said series of droplets lands on said surface substantially at the same instant of time, and means for humidifying the air in the pneumatic chamber to maintain the liquidity of the liquid in the first discharge channel.

2. Apparatus as claimed in claim 1, wherein said humidifying means comprises a housing for holding a liquid suitable for imparting moisture to air, a porous member dividing the interior of the housing into an air intake chamber portion and an air outlet chamber portion and partially disposed in the moisture imparting liquid in the housing interior to absorb the liquid, the intake chamber portion communicating with the air supply means and the outlet chamber portion communicating with the second chamber portion, whereby the liquid absorbed by the porous member moists the air passing therethrough as it is admitted from the intake chamber portion to the outlet chamber portion.

3. Apparatus as claimed in claim 1 wherein said humidifying means comprises a housing having top, bottom and side walls for holding a liquid suitable for imparting moisture to air, means defining an intake channel connected to the air supply means and disposed adjacent to the bottom wall of the housing to admit the air therefrom into the liquid in the housing, a porous member disposed in the liquid downstream of the admitted air to create air bubbles in the liquid, and an outlet channel adjacent to the top wall of the housing and connected to the second chamber portion.

4. Apparatus as claimed in claim 3, wherein said humidifying means further comprises a second porous member disposed between the surface of the liquid and the outlet channel.

5. Apparatus for applying liquid droplets to a surface comprising, a housing including a first liquid chamber for containing a liquid to be applied to a surface and having an associated piezoelectric device for generating short-duration rises of the pressure of liquid in the first liquid chamber, a second liquid chamber communicating with the first liquid chamber through a connecting channel and having a first discharge channel for droplets of said liquid to leave the apparatus, the first discharge channel being in alignment with the connecting channel and in close proximity thereto so that a short-duration pressure rise in the first liquid chamber causes a series of liquid droplets to be expelled through the first discharge channel, the second liquid chamber having a first intake channel connected to a liquid supply source, a pneumatic chamber substantially divided into an inner, disc-like portion formed with a second discharge channel and an outer, annular portion formed with a second intake channel connected to a source of pressurized air, the second discharge channel being in alignment with the first discharge channel and in close proximity thereto, and means for providing communication for the liquid supply source with the air supply source to increase the static pressure in the liquid in the liquid supply source to such a degree that the static pressure in the first discharge channel is substantially equal to the static pressure in the space between the first and second discharge channels.

6. Apparatus for applying liquid droplets to a surface as claimed in claim 5, wherein the ratio of the diameter of the first discharge channel to that of the second discharge channel is in a range substantially from 2:5 to 4:15.

7. Apparatus for applying liquid droplets to a surface as claimed in claim 6, wherein the diameter of said first discharge channel is 40 micrometers.

8. Apparatus for applying liquid droplets to a surface as claimed in claim 6, wherein the ratio of the diameter of said first discharge channel to the axial dimension of said disc-like chamber portion is substantially 1:less than 2.5.

9. Apparatus for applying liquid droplets to a surface as claimed in claim 8, wherein the axial dimension of said disc-like chamber portion ranges from 10 to 100 micrometers.

10. Apparatus as claimed in claim 5, wherein said communicating means includes means for regulating the pressure of the air supplied to said liquid supply source.

* * * * *